United States Patent [19]

Helfritch

[11] Patent Number: 5,213,780
[45] Date of Patent: May 25, 1993

[54] METHOD FOR NITROGEN OXIDE REDUCTION AND FLUE GAS REHEATING

[75] Inventor: Dennis J. Helfritch, Flemington, N.J.

[73] Assignee: Research-Cottrell, Inc., Somerville, N.J.

[21] Appl. No.: 709,815

[22] Filed: Jun. 4, 1991

[51] Int. Cl.⁵ .................... B01J 8/00; C01B 21/00
[52] U.S. Cl. ......................................... 423/239
[58] Field of Search .................. 423/239, 239 A

[56] References Cited

U.S. PATENT DOCUMENTS

| | | | |
|---|---|---|---|
| 3,770,389 | 10/1973 | Kitzner et al. | 23/288 F |
| 3,864,451 | 2/1975 | Lee et al. | 423/239 |
| 4,025,604 | 5/1977 | Moriguchi et al. | 423/239 |
| 4,141,959 | 2/1979 | Kato et al. | 423/239 |
| 4,585,632 | 4/1986 | Schneider et al. | 423/239 |
| 4,602,673 | 7/1986 | Michelfelder et al. | 423/239 |
| 4,726,935 | 2/1988 | Inatsune et al. | 422/171 |
| 4,732,743 | 3/1988 | Schmidt et al. | 423/239 |
| 4,739,826 | 4/1988 | Michelfelder et al. | 165/133 |
| 4,756,891 | 7/1988 | Ohlmeyer et al. | 423/239 |
| 4,806,320 | 2/1989 | Nelson et al. | 423/239 |
| 4,810,476 | 3/1989 | Ohlmeyer et al. | 423/239 |

Primary Examiner—Gregory A. Heller
Attorney, Agent, or Firm—Howrey & Simon

[57] ABSTRACT

The present invention pertains to a method for nitrogen oxide reduction and flue gas reheating wherein a catalyst surface is heated to an operating temperature to facilitate a catalytic reduction reaction in the presence of relatively cool flue gas. To avoid conventional complication the catalytic reduction reaction is performed downstream of both particulate control operations and desulfurization procedures. That is, the catalyst surface itself is placed just before the stack. The method of the present invention reheats the flue gas prior to its exit into the atmosphere.

13 Claims, 3 Drawing Sheets

METHOD FOR NITROGEN OXIDE REDUCTION AND FLUE GAS REHEATING

FIELD OF THE INVENTION

The present invention relates to a method for nitrogen oxide reduction and flue gas reheating, wherein a catalytic reduction reaction is performed downstream of flue gas desulfurization and particulate control operations.

BACKGROUND OF THE INVENTION

In the conventional nitrogen oxide producing technology including gas turbines, engines and power generators, fossil fuels are burnt to produce heat energy. A byproduct of this combustion is flue gas. Flue gas contains various contaminants such as nitrogen oxide ($NO_x$) and sulfur oxide ($SO_x$). Pursuant to certain federal environmental regulations, $NO_x$ and $SO_x$ emissions must be minimized prior to flue gas entrance into the atmosphere. To rid flue gas of $NO_x$ and $SO_x$, it has been the practice to utilize a catalytic reduction process and a desulfurization operation, respectively, as explained more fully below.

A catalytic reduction process employs a reducing agent and a catalyst surface. The reducing agent, ammonia ($NH_3$) for example, is injected into the flue gas upstream of the catalyst surface. At the catalyst surface the reduction reaction occurs. The catalyst surface is generally a vanadium or tungsten oxide supported on alumina.

In the catalyst reduction reaction, $NH_3$ reacts with $NO_x$ at the catalyst surface to yield nitrogen and water vapor as shown below:

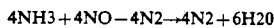

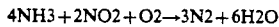

A catalytic reduction reaction takes place at the catalyst surface at a speed controlled largely by the particular operating temperature. The catalytic reaction above requires an operating temperature in the range of 600°-850° F. to achieve a sufficient speed of reaction. That is, the reaction must take place within the limited period that the flue ga contacts and passes through the catalyst surface. Once the flue gas has traveled downstream of of the catalyst surface the reaction is essentially halted, rendering removal of additional $NO_x$ impossible. Failure to provide the proper operating temperature can slow down the speed of the catalytic reduction, rendering the reaction incomplete.

Conventionally, the necessary operating temperature for the particular catalytic reaction has been achieved by reliance on the high temperature of the flue gas as it departs the boiler. The temperature of the flue gas as it departs the boiler is approximately 600°-800° F. and absent a separate reheating operation the temperature declines as the flue gas travels through the heat extraction system reaching a low of approximately 175° F. before entering the atmosphere. Thus, commonly the catalytic surface is placed near the boiler, the point in the heat extraction system where the flue gas can be expected to have attained a temperature in the operating range of approximately 600°-850° F.

As shown in FIG. 1, in conventional boiler applications to achieve the necessary operating temperature the catalyst surface 6' is placed after the boiler 2' and between the economizer 4' and the air heater 8'. In this arrangement the catalyst surface is upstream of the particulate control device 10' and the flue gas desulfurization unit 12'. With this conventional arrangement the catalytic reduction reaction occurs in advance of both the flue gas desulfurization and particulate control operations as explained fully below. This positioning sequence however, has proven unsatisfactory for at least the following reasons.

In the conventional operational sequence shown in FIG. 1, the catalytic process takes place in anticipation of the flue gas desulfurization operation, wherein sulfur oxides ($SO_x$) contaminates are removed from the flue gas before exiting the plant. Consequently, $SO_x$ contaminates are present in the flue gas during the catalytic reduction process. This generates multiple problems.

For instance, $NH_3$ can react with $SO_3$ contaminants to form ammonium sulfate and bisulfate, a fine, sticky white particulate. The catalyst surface being of a porous honeycomb material provides pocket areas for receipt of ammonia sulfate and bisulfate. The catalyst surface can become clogged and rendered ineffective. Thereafter, it can be difficult, if not impossible, to remove the ammonia sulfate and bisulfate from the catalyst surface. Consequently, the catalyst surface must be replaced necessitating machine downtime an hindering operation efficiency.

Ammonium sulfate and bisulfate can also contaminate or clog the air heater surfaces. The air heater may then need to be shut down and manually cleaned with water jets and steam. A further loss in machine efficiency results. Additionally, ammonium sulfate and bisulfate may form a fine particulate which can act as a smoke cloud increasing stack plume opacity. Moreover, $NH_3$, promotes the conversion of $SO_2$ to $SO_3$. Higher concentrations of $SO_3$ increase the acid dew point of the flue gas, the temperature at which sulfuric acid droplets form by condensation. As a result, in order to avoid acid condensation in the air heater, exit temperature must be increased. An energy system loss results and overall boiler efficiency is compromised.

The positioning of the catalytic surface prior to the particulate control operation in the conventional arrangement produces still more problems. Coal, typically burnt to produce heat energy, leaves residual composites of the silica fly ash in the flue gas. The silica fly ash contains sulfur oxides ($SO_2$) and alkaline metals. As shown in FIG. 1, normally this fly ash is removed by the particulate control equipment or an electrostatic precipitator located at a point in the system where the flue gas temperature has decreased to the rang of 300° F. downstream of the catalytic reduction process.

The performance of the catalytic reaction prior to the particulate control operation in effect means that fly ash remains in the flue ga during the catalytic reduction reaction. The presence of fly ash during the catalytic reduction reaction causes several difficulties. The catalyst surface can become poisoned by the absorption of sulfur oxides or the condensation of alkaline metals contained in the fly ash. The catalytic surface can be essentially rendered inoperable. Also, the catalyst surface may be fouled and/or eroded by the fly ash.

Of further relevance to the present invention is the conventional desire to reheat particular types of flue gas which have become cooled prior to their entrance into the atmosphere. This process is necessary in conjunction with relatively cool flue gas, having a temperature of less than 175° F. This is because where relatively cool flue gas exits the stack into the plant, water condensation immediately occurs causing unsightly white colored clouds of steam deposits. To avoid these white deposits, as illustrated in FIG. 1, flue gas is typically reheated just prior to its departure from the stack. The reheating procedure raises the flue gas temperature above 175° F. facilitating an upward flue gas velocity or buoyancy. Consequently, better atmospheric dispersion of the flue gas can be accomplished. Nonetheless, a separate reheating operation demands excessive energy consumption and is a costly procedure.

The present invention solves the foregoing problems of the conventional catalytic reduction process and simultaneously provides an efficient means for the reheating of flue gas. The present invention eliminates the difficulties inherent in employing a catalytic reduction operation upstream of both the flue gas desulfurization and particulate control processes, as outlined above, by placing the catalytic reduction operation downstream thereof. In the present invention, the catalytic reduction process is positioned just before the flue gas exit from the stack. As a result, the flue gas temperature upon encountering the catalytic reduction operation is incidentally increased. A dual benefit results whereby the nitrogen oxide is removed and the flue gas is reheated. A separate reheating steps is avoided, energy is saved and an otherwise loss in system energy is made beneficial.

SUMMARY OF THE INVENTION

An object of the present invention is to overcome the problems and disadvantages of the prior art.

Additional objects and advantages of the present invention are set forth in part in the following description, or may be learned by practice of the invention. The objects and advantages of the present invention will be realized and attained by means of the elements and combinations particularly pointed out in the appended claim.

To achieve the objects and in accordance with the purpose of the present invention, as embodied and broadly described herein, the present invention comprises the method of nitrogen oxide reduction and flue gas reheating comprising the steps of heating a catalyst surface to provide the requisite operating temperature for the catalytic reduction reaction. Delivering relatively cool flue gas to the catalyst surface for removal of nitrogen oxide. Transferring heat from the catalyst surface to the flue gas to cause a reheating of the flue gas to prevent water condensation in the stack exhaust. Performing the catalytic reduction reaction after a flue gas desulfurization operation and a particulate control procedure.

BRIEF DESCRIPTION OF THE DRAWINGS

The accompanying drawings, which are incorporated in and constitute a part of this specification, illustrate an embodiments of the present invention and together with the description, serve to explain the principles of the present invention.

DETAILED DESCRIPTION OF THE PRESENT INVENTION

The present invention pertains to a method for nitrogen oxide reduction and flue gas reheating wherein a catalyst surface is heated to an operating temperature to facilitate the catalytic reduction reaction in the presence of relatively cool flue gas. To avoid the conventional complications outlined above with regard to the system sequencing, the catalytic reduction reaction is performed downstream of both particulate control and desulfurization procedures. That is, the catalyst surface itself is placed just before the stack. As a result, the catalytic reduction reaction occurs subsequent to both the s particulate control and desulfurization operations. The method of the present invention additionally provides for the simultaneous reheating of the flue gas prior to its exit into the atmosphere.

The present invention achieves a catalytic reduction using a relatively cool gas and a hot catalyst surface. The present invention contemplates that the catalytic surface be located downstream of the flue gas desulfurization and particulate control equipment. It is the catalyst surface of the present invention which is heated to provide the requisite operating temperature for the catalytic reduction reaction, the flue gas, temperature being irrelevant. Indeed, the present invention allows for the decrease in flue gas temperature to the range of less than 175° F. prior to the commencement of the catalytic reduction reaction.

In the present invention, preferably the catalyst surface is heated to an operating temperature in the range of 600°–850° F. The present invention contemplates that the catalyst surface can be heated by means of electrical resistance wires or steam channels within its structure, external radiant heaters, or electromagnetic radiation.

The preferred heating means is a function of the composition and construction of the catalyst. While, radiant heating for example can be simply employed by shining infrared heaters on the catalyst, it requires a catalyst construction in which all the surfaces are visible to the heat source.

Figure 1:
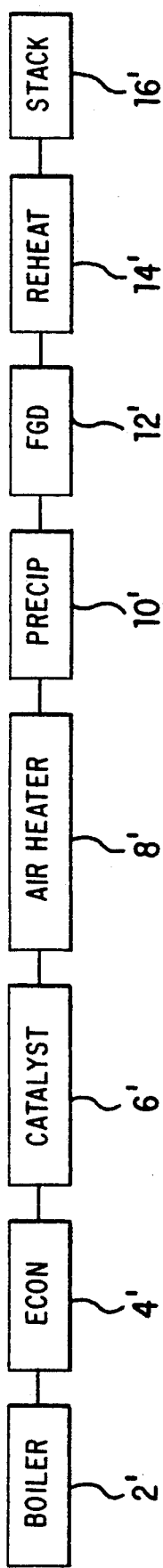
FIG. 1 shows a conventional catalytic reduction process.
Figure 2:
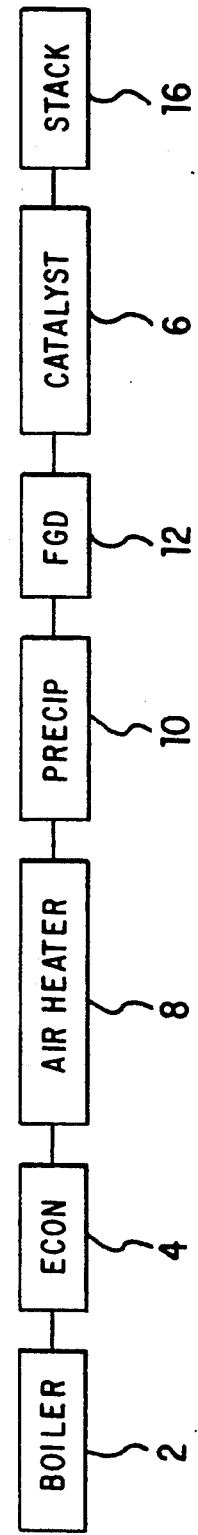
FIG. 2 shows the catalytic reduction and flue gas reheating process of the present invention.
Figure 3:
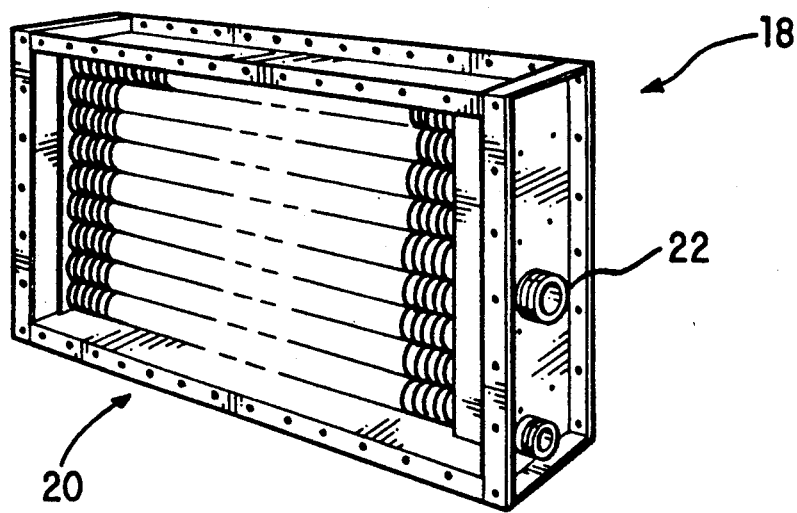
FIG. 3 shows a steam heating system including coils for heating the catalyst surface of the present invention.
Figure 4:
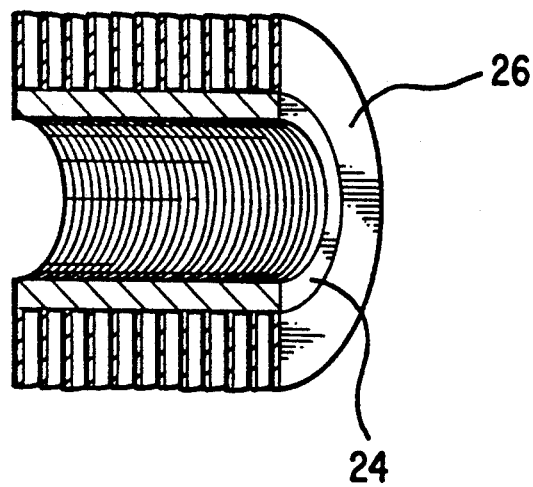
FIG. 4 shows an enlarged sectional of the single heating coil tube of the present invention.

Alternatively as shown in FIGS. 3 and 4, steam heating can be accomplished if the catalyst material is deposited on steam heating coils. Indeed, steam heating presents an inexpensive heating alternative to other means of heating. FIG. 3 depicts a steam heating system including steam heating coils wherein flue gas enters the structure in the direction of arrow 20. Steam distribution tube 22 allows steam heat to exit the system. FIG. 4 illustrates a cutaway of a single heating tube 24 having a catalyst material 26 located on the surface thereof.

Figure 5:
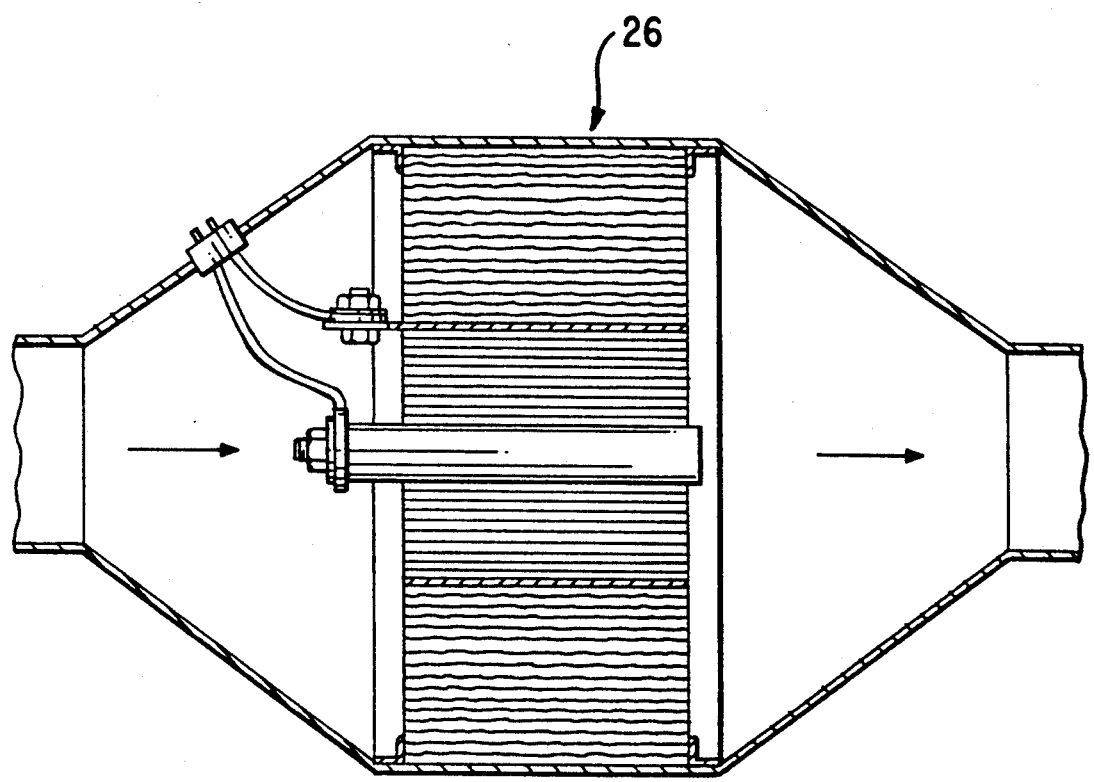
FIG. 5 shows a conventional electrically heated catalytic converter

Additionally, U.S. Pat. No. 3,774,389 to Kitzner et al., while not relating to $No_x$ removal, provides an electrically heated automobile catalytic converter 26 as depicted in FIG. 5. The present invention contemplates the use of electrical conductors akin to those of the Kitzner patent to heat the catalyst surface.

In the present invention, the catalyst is first brought up to operating temperature before flue gas is allowed to pass through. This is accomplished by turning on the heating source a period of time prior to starting up the rest of the system or preheating the catalyst.

In the method of the present invention heat transfer occurs between the hot catalyst surface and the cool gas. Consequently, the flue gas experiences a temperature increase upon encountering the catalyst surface prior to its departure therefrom. Put another way, the flue gas is incidentally reheated by the hot catalyst of the present invention. The amount of heat transferred or the increase in the flue gas temperature is a function of the catalyst surface area and the catalyst to gas temperature differential.

The amount of heat transferred from the catalyst surface to the gas is given by the heat transfer equation:

$$q = hA\Delta T$$

where h is the heat transfer coefficient, A is the surface area, and $\Delta T$ is the temperature difference between the surface and the gas.

The present invention has discovered that a satisfactory catalytic reduction reaction can be achieved irrespective of the flue gas temperature absent the use of a high temperature gas to maintain a hot catalyst. Accordingly, a hot catalyst in a cool gas produces an adequate catalytic reduction as a hot catalyst in a hot gas. The speed of the reduction reaction between nitrogen oxide and ammonia to produce molecular nitrogen and water is increased by the presence of a hot catalyst. Almost all gas reactions are greatly increased in rate by contact with hot surfaces, and certain surfaces, such as vanadium, yield the largest rate increases. For these catalyzed reactions, the catalyst surface must be hot, but the gas itself need not be hot.

The present invention's use of a heated catalyst surface to provide the requisite operating temperature for the catalytic reduction reaction, in contrast with the conventional catalyst arrangement provides multiple benefits. Since the catalyst reduction reaction occurs downstream of flue gas desulfurization, problems associated with $SO_2$ and $SO_3$, as depicted above, are avoided. Additionally, because the catalyst reduction reaction of the present invention takes place downstream of a particulate control device, difficulties attributable to fly ash are minimized. Moreover, since the catalyst temperature can be controlled independently of the gas temperature, good $NO_x$ control can be maintained during boiler load swings. Finally, in the present invention there is no need to supply a separate gas reheat system downstream of a scrubber.

Other embodiments of the present invention will be apparent to those skilled in the art from consideration of the specification and practice of the disclosed invention. It is intended that the specification and examples be considered as exemplary only, with the true scope and spirit of the invention being represented by the following claims.

What is claimed is:

1. A method of nitrogen oxide reduction and flue gas reheating comprising the steps of:
    subjecting flue gas to desulfurization and particulate control processes;
    heating a catalyst surface provided downstream of said desulfurization and particulate control processes solely by means separate from heat transfer from the flue gas to a temperature greater than that of flue gas in the vicinity of the catalyst to provide the requisite operating temperature for a catalytic reduction reaction;
    delivering the flue gas from the desulfurization and particulate control processes and a reactant to said catalyst surface to produce the catalytic reduction reaction for removal of nitrogen oxide; and
    transferring heat from said catalyst surface to said flue gas to reheat said flue gas and prevent water condensation in the stack exhaust.

2. The method of claim 1 wherein during the step of delivering the flue gas to said catalyst surface the temperature of the flue gas prior to contact with the catalyst surface is less than 175° F. and after contact therewith is greater than 175° F.

3. A method of nitrogen oxide reduction and flue gas reheating comprising the steps of:
    conducting flue gas to be reduced and reheated to a flue gas desulfurization system;
    providing a catalyst surface downstream of the flue gas desulfurization system;
    determining the requisite operating temperature for a satisfactory catalytic reduction reaction;
    heating said catalyst surface to said operating temperature solely by means separate from heat transfer from the flue gas to a temperature greater than that of flue gas in the vicinity of the catalyst; and
    delivering the flue gas and a reactant to said catalyst surface to simultaneously produce a catalytic reduction reaction and reheat said flue gas.

4. The method according to claim 3 including the step of:
    said operating temperature being in the range of 600°–850° F.

5. The method of claim 4 wherein during the step of delivering the flue gas to said catalyst surface the temperature of the flue gas prior to contact with the catalyst surface is less than 175° F. and after contact therewith is greater than 175°.

6. The method according to claim 3 including the step of:
    allowing heat to be extracted from said flue gas to cool it prior to contacting said catalyst surface.

7. The method according to claim 6 wherein the flue gas is cooled from a temperature in the range of 600° F.–800° F. to less than 175° F. as heat is extracted therefrom prior to contact with said catalyst surface.

8. The method according to claim 3 including the step of:
    removing fly ash from said flue gas by means of particulate control operations prior to said nitrogen oxide reduction and flue gas reheating to minimize fly ash contamination of said catalyst.

9. The method according to claim 3 including the step of:
    heating said catalyst surface by means of: electrical resistance wires.

10. The method according to claim 3 including the step of:
    heating said catalyst surface by means of internal steam channels.

11. The method according to claim 3 including the step of:
    heating said catalyst surface by means of external radiant heaters.

12. The method according to claim 3 including the step of:
    heating said catalyst surface by means of microwave radiation.

13. The method according to claim 3 including the step of:
    heating said catalyst surface by means of electromagnetic radiation.

* * * * *